Sept. 11, 1962  R. W. SCHULTZ  3,053,508
ANCHORING MECHANISM FOR AUTOMOBILE TRANSPORT TRAILERS
Filed Sept. 28, 1959

INVENTOR.
RALPH W. SCHULTZ
BY
ATTORNEY

United States Patent Office 3,053,508
Patented Sept. 11, 1962

3,053,508
ANCHORING MECHANISM FOR AUTOMOBILE TRANSPORT TRAILERS
Ralph W. Schultz, 604 2nd Ave. S., South St. Paul, Minn.
Filed Sept. 28, 1959, Ser. No. 842,707
4 Claims. (Cl. 254—164)

This invention relates to a take-up mechanism particularly adapted for anchoring a spring mounting vehicle to the bed of a trailer transporting the same.

It is an object of this invention to provide a manually operated self-locking take-up mechanism in which a cable attached to the object to be anchored is taken up and wound around a drum.

It is another object to provide such a take-up mechanism which produces a relatively great amount of take-up tension on the take-up cable by repeating applications of a small amount of force to an actuating lever.

It is a further object to provide such a self-locking take-up mechanism which may be unlocked to release take-up tension on the take-up cable by manipulation of the same lever that is operated to take up and anchor the cable.

It is also an object to provide a take-up mechanism which has a tension spring at the free end of the take-up cable to insure maintenance of steady anchoring pressure upon a spring mounted vehicle tending to bounce upin the bed of the trailer transporting the same.

It is another object to provide such a take-up mechanism which is highly efficient, easily and readily operated, and which is small in size to permit the convenient installation and use of a plurality of such mechanism upon a single trailer for anchoring a number of objects thereto.

These and other objects and advantages of my invention will more fully appear from the following descriptions made in connection with the accompanying drawings, wherein like reference characters refer to the same or similar parts throughout the several views, and in which.

Figure 1:
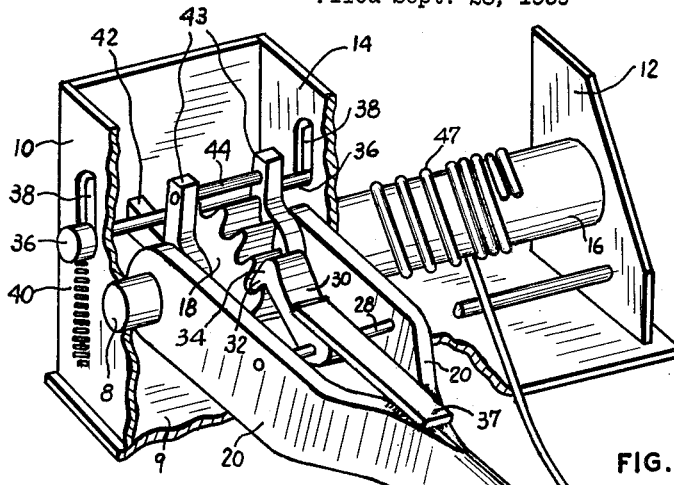
FIG. 1 is a perspective view showing the front of the take-up mechanism with the supporting housing and the removable handle partly broken away.
Figure 2:
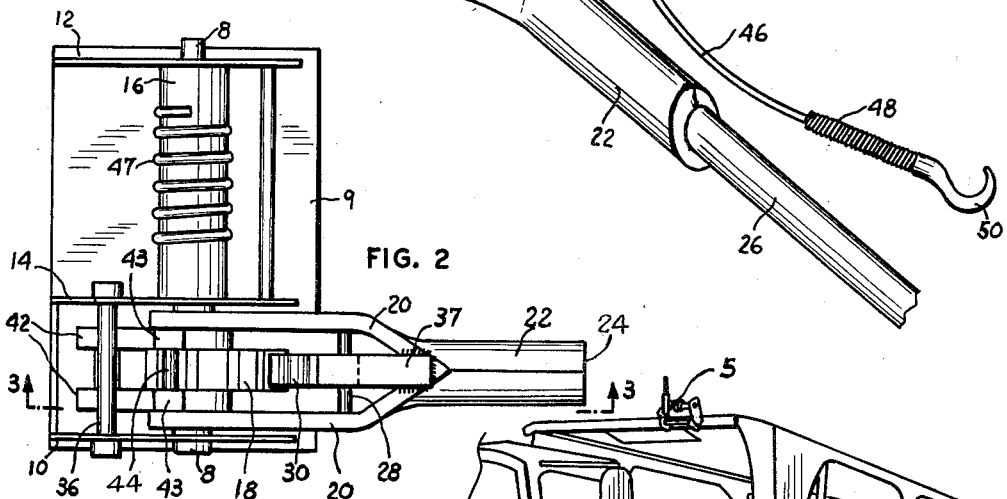
FIG. 2 is a plan view of the top of the mechanism.
Figure 3:
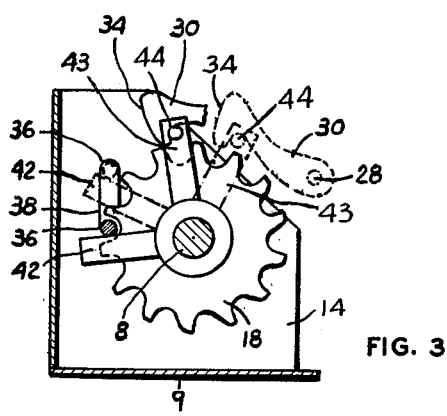
Figure 4:
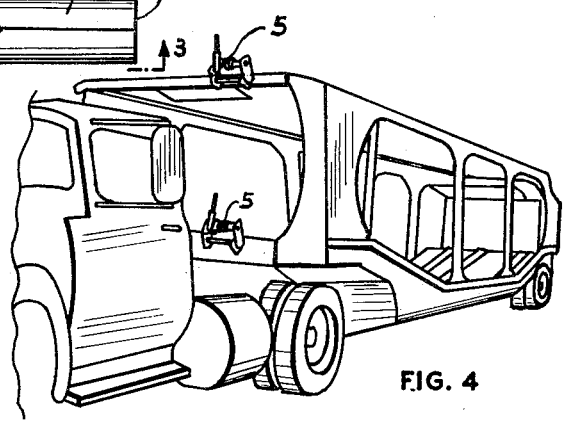

FIG. 3 is a sectional side view taken along the line 3—3 in FIG. 2 with the actuating levers removed showing the hook portion of the dog in solid lines in engaged position with the lock releasing device and also showing the dog in dotted lines holding the locking device in unlocked position; and, FIG. 4 is a perspective view showing a pair of the take-up mechanisms mounted upon an automobile transport trailer.

In the form of the invention shown in the accompanying drawings, a horizontal rotary shaft 8 is journalled in openings provided through a pair of upright housing end panels 10 and 12 which are attached to a flat bottom panel 9. The shaft 8 passes through an opening in an upright panel 14 disposed between the end panels 10 and 12. A rotary drum 16 is attached to the shaft 8 for rotation therewith between the end panel 12 and the panel 14. A ratchet wheel 18 is attached to the shaft 8 for rotation therewith at an intermediate position between the end panel 10 and the panel 14. A pair of generally parallel lever arms 20 are rotatably mounted on the shaft 8 respectively disposed on each side of the ratchet wheel 18. The lever arms 20 extend forwardly and outwardly from the shaft 8 beyond the wheel 18 and are joined together to form a mounting arm 22 having an opening 24 therethrough for holding a removable lever arm 26. A dog mounting rod 28 is journalled respectively at both ends thereof upon the lever arms 20 in spaced relation from the ratchet wheel 18.

A dog member 30 is swingably mounted upon the cross rod 28. The free end of the dog member 30 is formed into a downwardly projecting hook 32 designed to fall into the interdentate spaces on the ratchet wheel 18 and to impart take-up rotary motion to said wheel when said lever arm 26 is swung about said shaft in a forward and downward direction. A camming surface 34 is provided on the outer free end of the dog member 30 to ride over the teeth of the wheel 18 when the lever arm 26 is moved in the return direction. A resilient return member such as the leaf spring 37 is attached to the mounting arm 22 at one end thereof and the other end thereof is extended into engagement with the dog 30 to exert pressure thereon to urge the hook 32 into interdentate engagement with the ratchet wheel 18. For take-up operation the free end of the lever arm 26 is swung upwardly and backwardly to disengage the dog 30 from the teeth of the ratchet wheel 18 and move the camming surface 34 of the dog over one or more of the said wheel teeth, and the lever arm 26 is then swung downwardly whereby the dog hook 32 engages one of the teeth of the wheel 18 and rotates the same in a forward take-up direction.

A locking rod 36 is mounted for rectilinear movement parallel to the shaft 8 within a pair of opposed vertically-oriented keeper slots 38 which in the form shown are formed in the panels 10 and 14 in spaced apart relation to the ratchet wheel 18. A pair of vertically disposed spiral tension springs 40 are respectively attached to the lower portions of the panels 10 and 14 at the lower ends thereof and the upper ends are connected to the respective end portions of the locking rod 36 to urge the same into a normally horizontal position in abutment with the lower ends of the keeper slots 38. In such normal position, the locking rod 36 lockingly engages the teeth of the ratchet wheel 18 and prevents the same from rotating in either direction when the lever arm is not being operated. When the take-up lever arm is operated to rotate the ratchet wheel 18 in a forward take-up direction, the locking rod 36 is cammed upwardly in the keeper slots 38 by the teeth of the ratchet wheel 18.

A pair of bell cranks each having lever arms 42 and 43 are rotatably attached to the shaft 8 respectively on each side of the ratchet wheel 18. The free ends of said lever arms 42 and 43 extend beyond the periphery of the ratchet wheel 18. The opposed parallel lever arms 42 are positioned to engage the underside of the locking cross rod 36, and the opposed lever arms 43 are interconnected by a cross rod 44 positioned in spaced apart relation to the ratchet wheel 18 and which is normally positioned in overlying relation to said ratchet wheel and generally parallel to the rotary shaft 8. For unlocking the ratchet wheel to permit movement releasing the tension on the take-up cable, the lever arm 26 is swung about the shaft 8 in an upward direction until the cam surface 34 of the dog 30 rides over the bell crank cross rod 44 and the hook 32 engages and overlies the same. The lever arm 26 is then rotated forwardly and downwardly whereby the hook 32 of the dog 30 being interlocked with the cross rod 44, moves the same in a forward and downward direction and rotates the bell crank upon the shaft 8. The lever arms 42 of the bell crank engaging the underside of the locking cross rod 36 are thereby moved upwardly to elevate the rod 36 within the keeper slots 38 and thereby disengage the same from locking positon with the teeth of the ratchet wheel 18 to thus release the ratchet wheel 18. The spiral springs 40 urge the locking rod 36 back into ratchet wheel locking position when the lever arm 26 is operated to release the bell crank cross rod 44 from the dog hook.

A take-up cable 46 is attached to the drum 16 and is spirally wound therearound when the drum is rotated in take-up direction. A helical ridge 47 is formed upon the surface of the drum to guide the cable as the same is coiled upon the drum 16 to prevent the cable from becoming entangled thereon. A tension spring element 48 is attached to the free end of the cable 46 to insure a steady hold-down pressure against the object being anchored. A hook member 50 is attached to the other end of the cable 46 for attaching the same to the object to be anchored.

As shown in FIG. 4, a plurality of my anchoring mechanisms designated by the number 5 may be mounted for easy access at different positions on a trailer, and one or more of the take-up mechanisms may be provided for anchoring each of the automobiles carried by an automobile transport trailer.

It will be seen that I have provided a very simple and highly efficient take-up mechanism of small and inexpensive construction which may conveniently be mounted upon a transport trailer for quickly and easily anchoring automobiles securely thereto.

It will, of course, be understood that various changes may be made in the form, details, arrangement and proportion of parts without departing from the scope of my invention, which generally stated, consists in the matter set forth in the appended claims.

What is claimed is:

1. In a take-up mechanism comprising supporting means, a rotary shaft journalled upon said supporting means, a take-up ratchet wheel mounted on said rotary shaft for rotation therewith, and a take-up lever rotatably mounted on said shaft, the invention comprising a dog member pivotally mounted on said take-up lever and having a hook formed at the free end thereof, said hook being normally maintained in interdentate engagement with said ratchet wheel, and being adapted to impart rotary motion to said ratchet wheel in take-up direction when said take-up lever is swung arcuately in one direction, and being adapted to ride over the teeth of said ratchet wheel when said take-up lever is swung in the reverse direction, a locking member, resilient means normally holding said locking member in locking position in engagement with the teeth of said ratchet wheel wherein said locking member permits rotation of said ratchet wheel in take-up direction only, a release mechanism engageable by the hook on said dog member to shift said locking member out of locking positon and permit rotation of said wheel in release direction, a drum member attached in fixed relation to said rotary shaft, and an elongated flexible take-up member attached to said drum member and being taken up and wound therearound when said drum member is rotated by said shaft in take-up direction.

2. In a take-up mechanism comprising supporting means having a rotary shaft journalled thereon, a take-up ratchet wheel mounted on said rotary shaft for rotation therewith, and a take-up lever rotatably mounted on said shaft, the invention comprising a dog member pivotally mounted on said take-up lever and having a downwardly projecting hook formed at the free end thereof, said dog member being mounted in spaced apart cooperative relation to said ratchet wheel whereby said hook normally falls into one of the interdentate spaces on said ratchet wheel, resilient spring means normally retaining said dog member in engagement with one of the teeth of said ratchet wheel whereby said wheel may be forcibly rotated to cause rotation of said rotary shaft in forward take-up direction by swinging movement of said take-up lever in arcuately forward and downward direction, said dog member having a camming surface to ride over the teeth of said ratchet wheel when said take-up lever is swung arcuately around said shaft in the reverse direction, a locking rod mounted for rectilinear movement parallel to said rotary shaft within a pair of generally vertical keeper slots provided in generally horizontal alignment within said supporting means, said locking rod being normally maintained in locking position in abutment with the lower ends of said keeper slots to intermesh with the teeth of said ratchet wheel and prevent reverse rotation of said wheel, resilient spring means attached to said supporting means and to said locking rod to normally positively hold said locking rod in locking position, bell crank means rotatably mounted on said rotary shaft and having lifting means engaging the under side of said locking rod, said bell crank means having cross rod means normally positioned in overlying spaced relation to said ratchet wheel and engageable by the hook on said dog member when said take-up lever is swung in arcuate upward and backward direction, downward swinging of said lever when said dog hook is in engagement with said cross rod means causing said lifting means to engage said locking rod to elevate the same within said keeper slots and out of said locking position to permit rotation of said ratchet wheel in reverse direction, a generally cylindrical drum being attached to said rotary shaft for rotation therewith and disposed in spaced apart relation to said ratchet wheel, and an elongated flexible take-up member attached to said drum at one end thereof and being taken up and wound around said drum when the same is rotated in take-up direction.

3. The structure set forth in claim 2 and said take-up lever comprising a pair of levers rotatably mounted respectively on each side of said ratchet wheel and the free ends thereof extending outwardly beyond said ratchet wheel and being joined together to form a mounting arm and having an opening therein for receiving and holding a removable lever forming an extension thereof.

4. The structure set forth in claim 3 ridge and groove means provided spirally surrounding said drum to guide said flexible take-up member onto said drum and prevent entanglement thereof, said flexible take-up member having resilient tension spring means provided therein adjacent to the free end thereof to insure steady maintenance of anchoring tension upon the take-up member.

References Cited in the file of this patent
UNITED STATES PATENTS

| | | |
|---|---|---|
| 814,024 | Cue | Mar. 6, 1906 |
| 1,570,607 | Bashline | Jan. 26, 1926 |
| 2,706,614 | Gilbert | Apr. 19, 1955 |
| 2,738,204 | Ibey | Mar. 13, 1956 |
| 2,946,563 | Eaton | July 26, 1960 |